United States Patent [19]

Nakamura

[11] Patent Number: 5,278,604
[45] Date of Patent: Jan. 11, 1994

[54] INFORMATION PROCESSING SYSTEM FOR CAMERA

[75] Inventor: Katsunori Nakamura, Kanagawa, Japan

[73] Assignee: Canon Kabushiki Kaisha, Tokyo, Japan

[21] Appl. No.: 820,971

[22] Filed: Jan. 15, 1992

[30] Foreign Application Priority Data

Jan. 18, 1991 [JP] Japan ................. 3-004458

[51] Int. Cl.$^5$ .................................... G03B 7/00
[52] U.S. Cl. ........................ 354/412; 354/286
[58] Field of Search .................. 354/412, 286

[56] References Cited

U.S. PATENT DOCUMENTS

| | | | |
|---|---|---|---|
| Re. 33,015 | 8/1989 | Nakai et al. | 354/286 |
| 4,477,168 | 10/1984 | Nakai et al. | 354/286 |
| 4,769,665 | 9/1988 | Dagborn | 354/412 |
| 4,814,802 | 3/1989 | Ogawa | 354/286 |
| 4,853,733 | 8/1989 | Watanabe et al. | 354/412 |
| 4,860,113 | 8/1989 | Miyamoto et al. | 354/286 |
| 5,060,005 | 10/1991 | Itoh et al. | 354/412 |
| 5,126,780 | 6/1992 | Satou et al. | 354/286 |

*Primary Examiner*—Russell E. Adams
*Attorney, Agent, or Firm*—Robin, Blecker, Daley & Driscoll

[57] ABSTRACT

The present invention relates to an information processing device for writing data into a computer incorporated in a camera body or reading data from the computer. According to the present invention, there is provided an information processing device which is inserted between the camera body and an accessory device to execute writing of data into the computer of the camera body or reading of data from the computer and to execute data communication between the computer of the camera body and the accessory device.

10 Claims, 9 Drawing Sheets

INFORMATION PROCESSING SYSTEM FOR CAMERA

BACKGROUND OF THE INVENTION

1. Field of the Invention

The present invention relates to an information input/output device for a camera and, more particularly, to an information input/output device for a camera which makes it possible to carry out adjustment of an electronic circuit incorporated in a camera body or that incorporated in an accessory, as well as to carry out writing and/or erasure of stored data, with various accessories remaining attached to the camera body.

2. Description of the Related Art

In recent automated cameras, one-chip microcomputers are generally mounted in their interiors, and such a camera has an exclusive input terminal for writing or erasing data into or from a memory device or a memory of the one-chip microcomputer. The exclusive input terminal is commonly provided on an exterior part of the camera or inward of an exterior cover of the camera. After the completion of assembly of the camera, an external information input device is connected to the exclusive input terminal so that the writing and/or erasure of data is performed.

However, such a conventional example has a number of disadvantages. In the conventional example where the exclusive input terminal is provided in the interior of the camera at a location isolated from the outside, if corrected data is to be written into the memory device, a time-consuming operation is needed such as removal of an exterior member from the camera or disassembly of an internal part of the camera. The conventional example in which the exclusive terminal for writing corrected data is provided on the exterior part of the camera requires addition of a part unnecessary for the operation of the camera, resulting in an increase in cost. An example utilizing a communication terminal for communication with a device electrically connected to a camera body is proposed in, for example, Japanese Laid-Open Patent Application No. Sho 62-7038. However, if an external communication device is attached to the camera, as in the proposed arrangement, it is impossible to attach a device which is to be originally attached to the camera, with the result that it is impossible to check the device at the same time.

SUMMARY OF THE INVENTION

It is, therefore, an object of the present invention to provide an information input/output device for a camera which makes it possible to execute a subroutine program stored in a microcomputer of a camera body or to execute the operation of writing data into a memory which is provided in a lens device or in an accessory or of rewriting or erasing data stored in such a memory, with the lens device or the accessory remaining attached to the camera body.

Another object of the present invention is to provide an information input/output device for a camera which makes it possible to write corrected data for each individual camera into, or erase such corrected data from, a memory device of the camera with an external communication device and a tool as well as an accessory remaining connected to a camera body, by connecting an external interface circuit to a communication terminal provided on the camera body for the purpose of communication with the accessory.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of the present invention will be described below with reference to the accompanying drawings.

Figure 1:
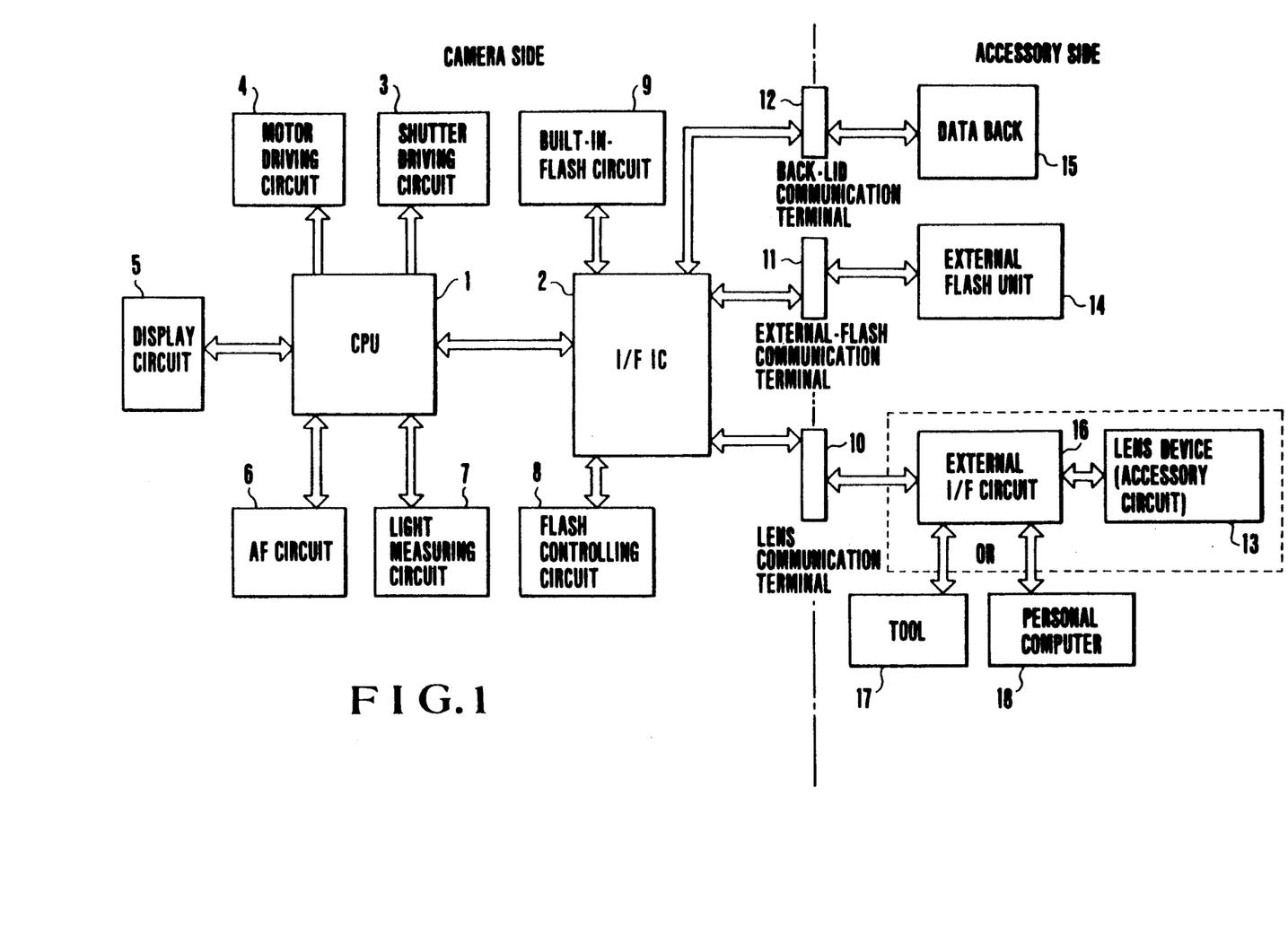
FIG. 1 is a block diagram schematically showing an arrangement in which information is inputted and outputted to and from a camera in accordance with an embodiment of the present invention.
Figure 2:
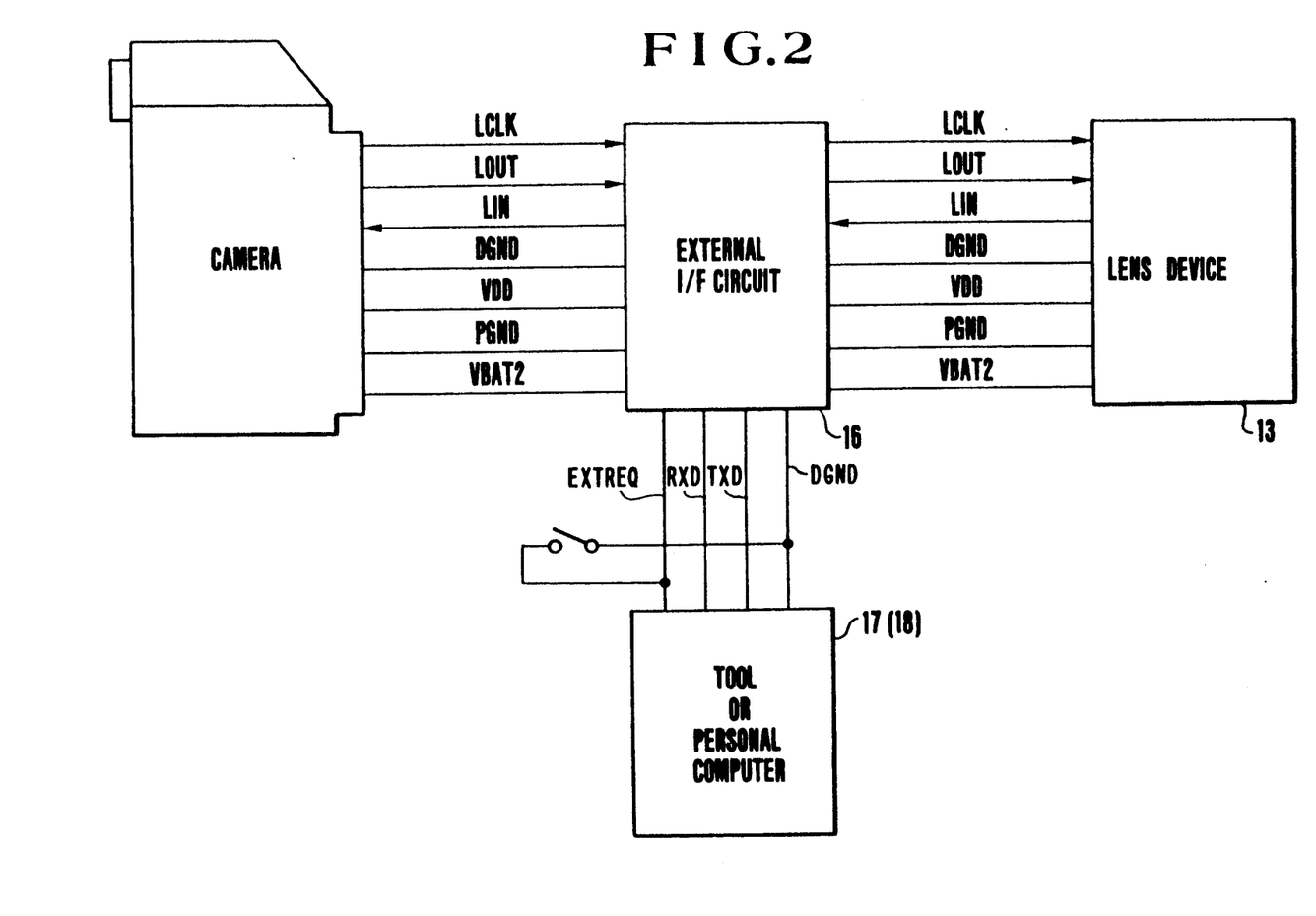
FIG. 2 is a block diagram schematically showing the signal-coupling relationship between the camera, a lens device, an external I/F (interface) circuit and a tool or a personal computer in the arrangement shown in FIG. 1.

FIGS. 1 and 2 show the embodiment of the present invention. FIG. 1 is a schematic block diagram showing an entire camera and accessories attachable thereto, and FIG. 2 is an illustration showing the coupling of signals between primary ones of the elements shown in FIG. 1.

In FIG. 1, the left-hand portion is a block diagram showing the internal construction of the camera body and the right-hand portion is a block diagram showing a state wherein the accessories are attached to the camera body. The camera body includes a one-chip microcomputer (hereinafter referred to as a "CPU") 1 for performing sequence control of the entire camera, various kinds of computation processing and various kinds of circuit control. The camera body also includes an I/F IC (interface integrated circuit) 2 for performing interfacing between various circuits and the CPU 1 during the execution of control of these circuits according to a command sent from the CPU 1, or interfacing for communication between external accessories or internal circuits and the CPU 1.

The CPU 1 performs circuit control of associated circuits such as a shutter driving circuit 3, a motor driving circuit 4 for performing the motor-driving operation required to transport film or to charge a shutter or a mirror, a display circuit 5 for providing visual display according to the sequence of the camera, an AF circuit 6 for performing automatic focus detection, a light measuring circuit 7 having a light receiving element, a flash controlling circuit 8 for controlling the charging and flashing of a built-in-flash circuit 9 and for stopping the flashing of the built-in-flash circuit 9 when the amount of flashing reaches a set level.

Communication terminals 10, 11 and 12 are provided for communication with individual camera accessories. The communication terminal 10 for communication with a lens device 13 is provided on the lens-attaching mount of the camera body. The communication terminal 11 for communication with an external flash unit 14 is provided on the accessory shoe of the camera body. The communication terminal 12 is provided for communication with a data back 15 which is attached to the back-lid portion of the camera body so that an operator can input or set data such as TV (shutter speed), AV (aperture value) and date. An external I/F (interface) circuit 16 controls communication between the camera and the lens device 13 and communication between the camera and a tool 17 or a personal computer 18. In practice, various kinds of tools 17 are prepared for individual adjustment steps. The personal computer 18 is used for check, repair or the like.

FIG. 2 shows signal lines which interconnect the camera, the external IF circuit 16, the lens device 13 and the tool 17 or the personal computer 18 through the lens communication terminal 10 in the aforesaid embodiment. Referring to FIG. 2, in an ordinary condition, seven kinds of signals are communicated through the lens communication terminal 10 (provided on the lens-attaching mount) of the camera directly between the camera and the lens device 13 without the use of the external I/F circuit 16. In the shown embodiment, the external I/F circuit 16 is connected to the lens communication terminal 10 of the camera, and the tool 17 or the personal computer 18 is connected to the external I/F circuit 16 so that writing or erasure of corrected data within the camera and execution of a subroutine program can be controlled through the lens communication lines extending between the camera and the lens device 13. As a matter of course, as shown, the lens device 13 may also be connected to the external I/F circuit 16 so that the lens device 13 can be made to perform aperture control or AF control in accordance with a command signal from the tool 17 side.

Although not shown, the external I/F circuit 16 may be disposed in an intermediate tube connected between the lens-attaching mount of the camera and the lens device 13.

Figure 3:
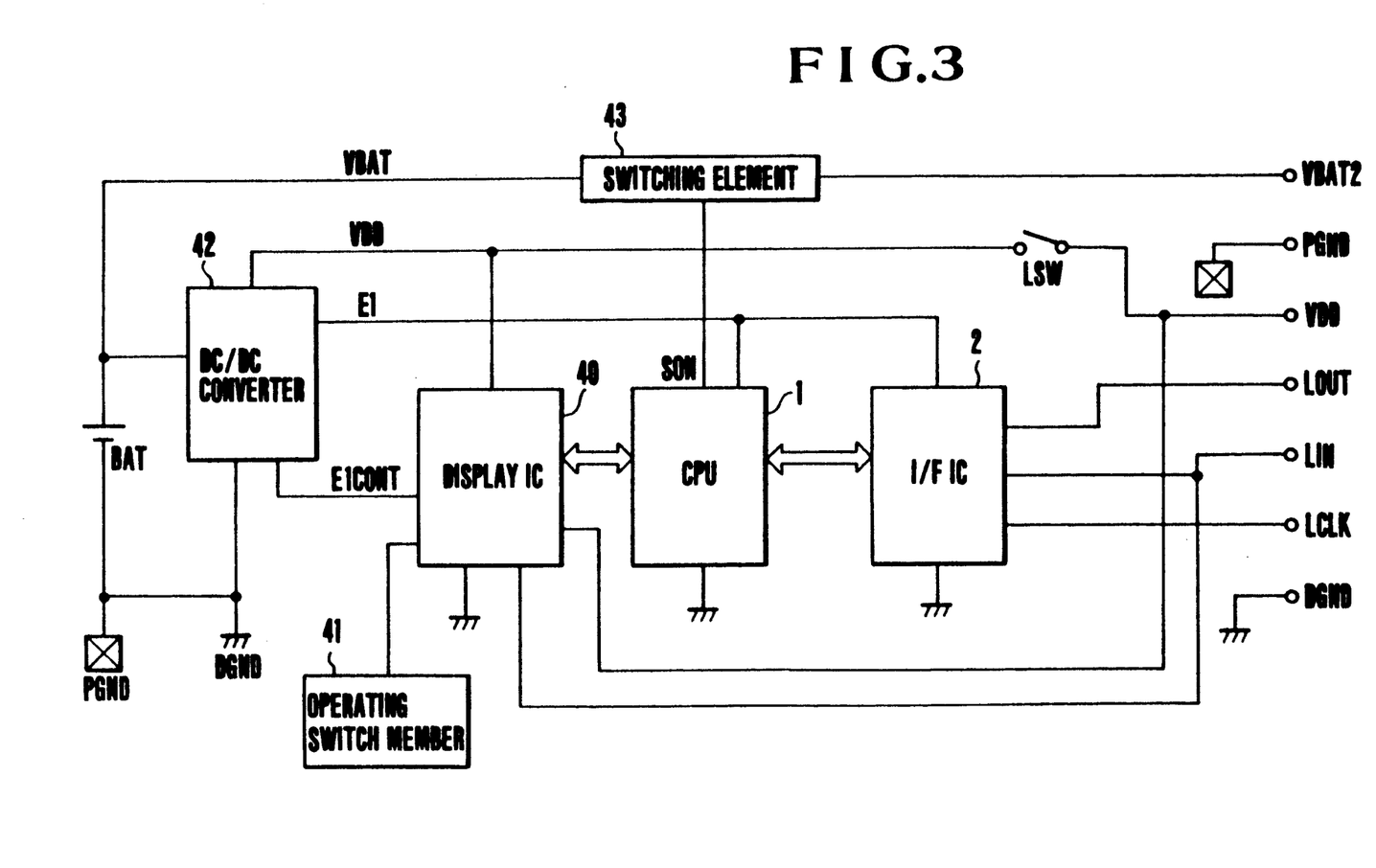
FIG. 3 is a circuit diagram schematically showing the portion of the camera that is associated with the embodiment of the present invention.

The function of each signal will be described below with reference to FIGS. 2 to 4. FIG. 3 illustrates signals which are communicated in the camera and which are coupled to the lens communication terminal 10. LCLK, LOUT and LIN respectively indicate lines for performing serial communication between the lens device 13 and the camera via the CPU 1 and the I/F IC 2. The LCLK line serves as a line along which a reference clock for such serial communication is transmitted, the LOUT line serves as a data line extending from the CPU 1 to the lens device 13, and the LIN line serves as a data line extending from the lens device 13 to the CPU 1. The LIN terminal is also connected to a display IC 40, and if the LIN signal is set to its low level by the lens device 13, a request for communication is transmitted from the lens device 13 to the camera.

The display IC 40 transmits data to a display device. In addition, if a request for communication is externally received or if an operating switch member 41 of the camera is operated, the display IC 40 can turn on an E1 line which extends as a power source line to both of the CPU 1 and the I/F IC 2 from a known DC/DC converter 42 connected to a source battery BAT of the camera, through an E1CONT terminal, in order to reduce the power consumption of the camera.

A VDD line, which is another output line from the DC/DC converter 42, consistently provides a DC output if the source battery BAT of the camera is connected to the DC/DC converter 42. The VDD line is also connected to the display IC 40 and to a lens terminal VDD through a lens-attachment switch LSW which is turned on when the lens device 13 is attached to the camera, whereby the power of the source battery BAT is supplied to a lens-in IC. The VDD terminal is connected to the display IC 40 and, if the lens device 13 is attached, turns on the E1 line to place the CPU 1 and the I/F IC 2 in their respective operable states. Thus, the fact that the lens device 13 has been attached is carried from the display IC 40 to the CPU 1 as a request for communication issued from the lens device 13, whereby communication with the lens device 13 is initiated. If it is determined through this communication that the lens device 13 is a lens device controllable by the camera, the CPU 1 turns on its SON terminal to turn on a switching element 43, thereby supplying a voltage to a lens terminal VBAT2 over a VBAT line connected to the plus side of the source battery BAT. The aforesaid terminals VBAT2, LOUT, LIN and LCLK as well as terminals PGND and DGND are provided on the lens-attaching mount of the camera, as described previously.

The lens device 13 drives actuators such as an aperture driving motor and a zoom driving motor by means of the voltage supplied through the lens terminal VBAT2. The minus side of the source battery BAT of the camera is connected to the terminal PGND which serves to increase current efficiency relative to each of the actuators, and to the terminal DGND which extends to associated circuit elements such as digital circuits and ICs. Of the lens communication terminals, two terminals are respectively connected to these two ground lines. The above-described seven kinds of signals are coupled to the respective lens communication terminals so that the communications between the lens device 13 and the camera as well as the supply of electric power from the camera to the lens device 13 are carried out.

Figure 4:
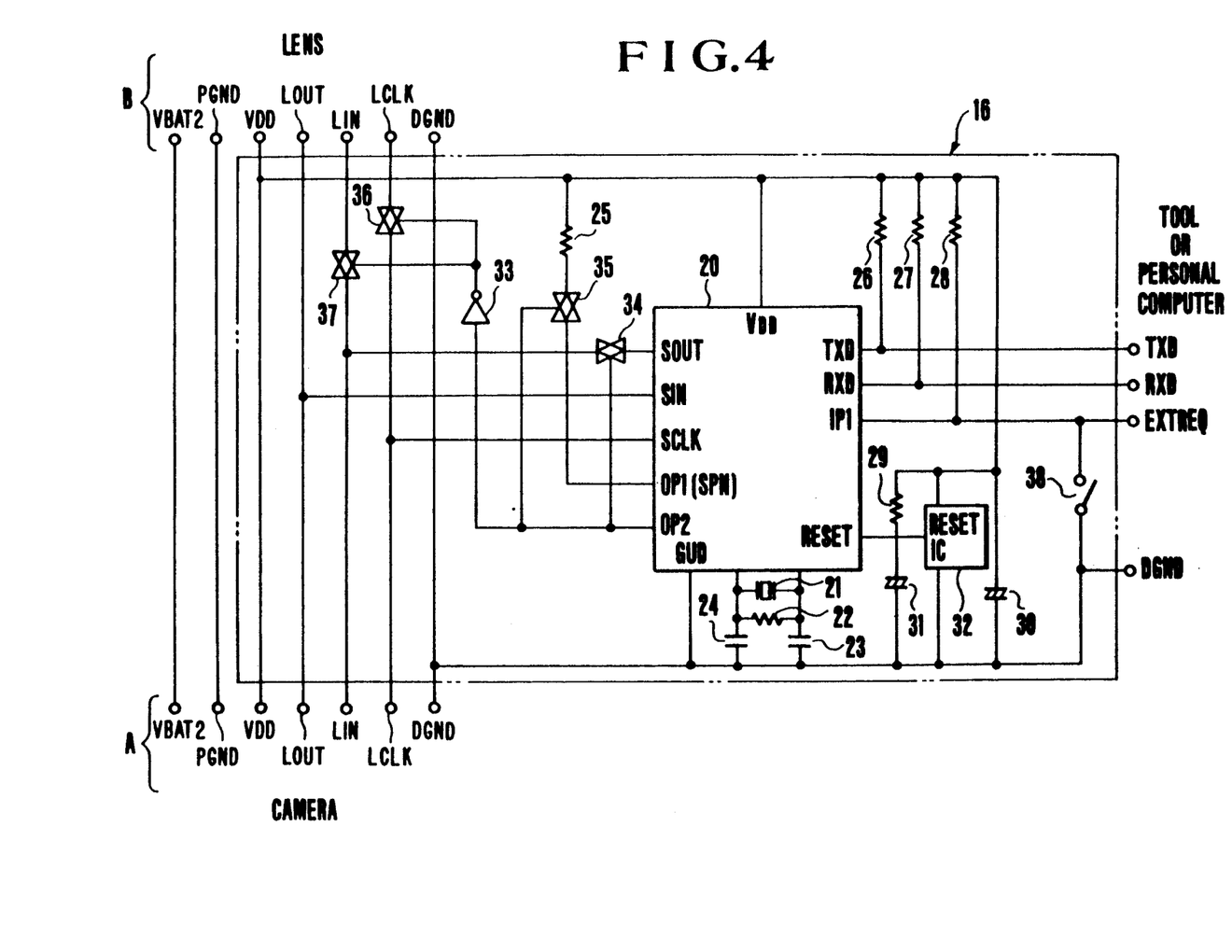
FIG. 4 is a circuit diagram schematically showing an external I/F circuit used in the arrangement of FIG. 1.

FIG. 4 is a circuit diagram schematically showing the external I/F circuit 16 shown in FIG. 1. The external I/F circuit 16 is disposed within the intermediate tube, and a terminal group A is provided on the camera-attaching end face of the intermediate tube which opposes the mount face of the camera. The terminals of the terminal group A are connected to the associated lens communication terminals of the camera. In this state, the lens device 13 can also be connected to the other terminal group B of the external I/F circuit 16. The external I/F circuit 16 is connected to the tool 17 or the personal computer 18 by three signal lines and one ground line. A programmable general-purpose microcomputer (hereinafter referred to as an "SPU") 20 is disposed in the middle of the external I/F circuit 16 includes a program which selectively allows communication between the camera and the tool 17 and communication between the lens device 13 and the tool 17. Accordingly, the SPU 20 can selectively establish communication between the camera and the tool 17 and communication between the camera and the lens device 13.

The external I/F circuit 16 shown in FIG. 4 also includes an oscillator 21, an oscillation stabilizing resistor 22 and oscillating capacitors 23 and 24, and these elements constitute a reference oscillating circuit for the SPU 20. The external I/F circuit 16 shown in FIG. 4 further includes signal pull-up resistors 25, 26, 27, 28 and 29, source-voltage stabilizing capacitors 30 and 31, and a reset IC 32 which detects the circuit source voltage VDD which is supplied from the camera when the external I/F circuit 16 is attached to the camera, and initializes the SPU 20.

When a switch 38 connected to an external interrupt signal line EXTREQ is turned on, an input port IP1 of the SPU 20 goes to its low level, whereby a request for communication from the tool 17 to the camera is initiated. When the input port IP1 goes to the low level, an output port OP2 of the SPU 20 is set to its high level, causing an inverter 33 to turn off analog switches 36 and 37 which, as shown in FIG. 4, are respectively inserted in two of the communication lines between the camera and the lens device 13. Thus, the communication with the lens device 13 is disabled and communication with the tool 17 is enabled. Simultaneously, a terminal SOUT of the SPU 20 is set to its low level and the output of an analog switch 34 goes to its low level, whereby the camera-in CPU 1 and the external I/F circuit 16 are placed in a communication-enable state by the function of the LIN terminal. Thus, the CPU 1 determines that the request for communication from the lens device 13 has issued, and initiates communication with the lens device 13 to detect whether the lens device 13 is a lens device which can communicate with the camera. However, at this time, since the analog switches 36 and 37 in the external I/F circuit 16 are off, the communication lines to the lens device 13 are set for communication with terminals SCLK and SIN of the SPU 20. This communication is carried out as transmission of 1-byte data.

Figure 5:
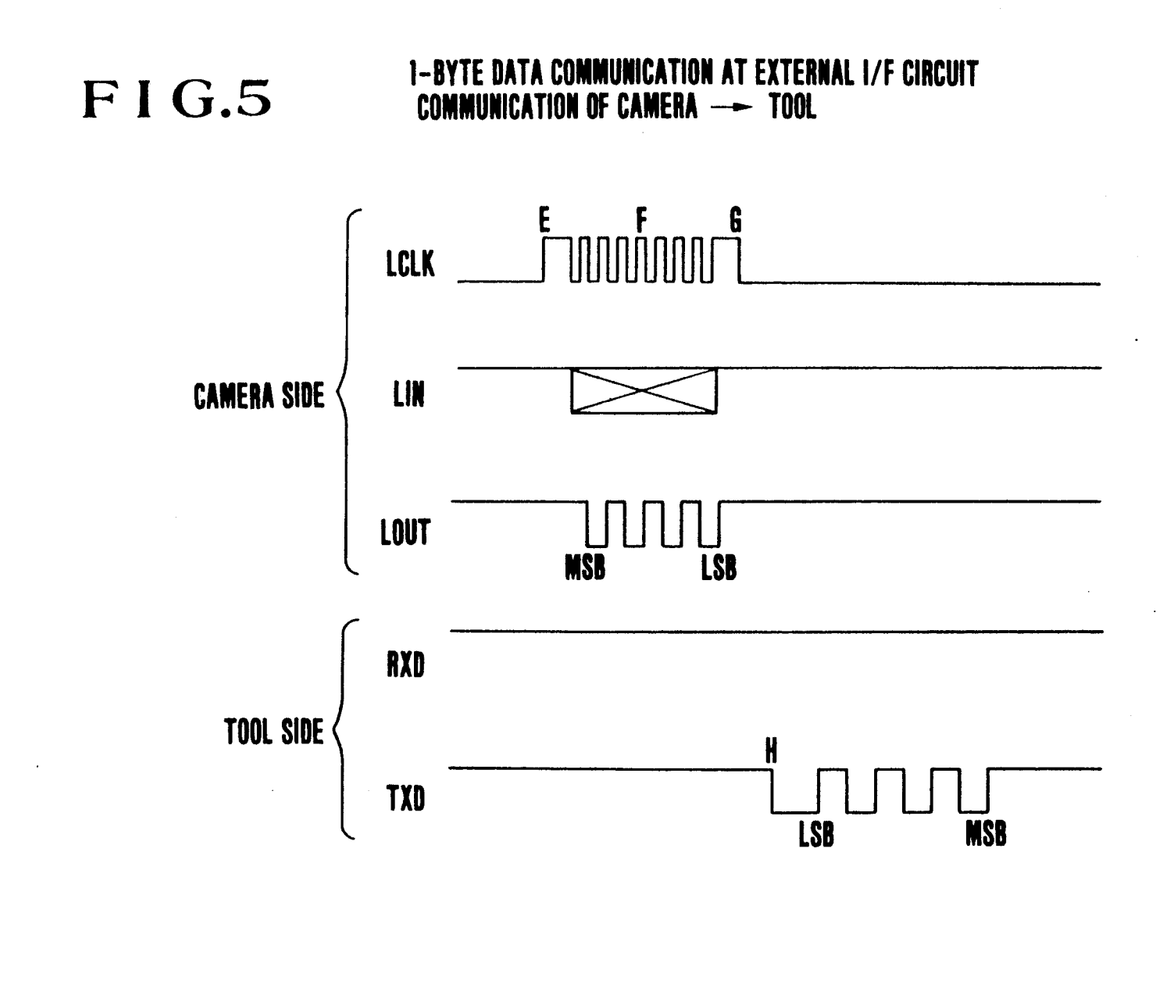
FIG. 5 is a timing chart illustrating the serial communication of signals from the camera to a tool 17 in the arrangement of FIGS. 1 and 2.
Figure 6:
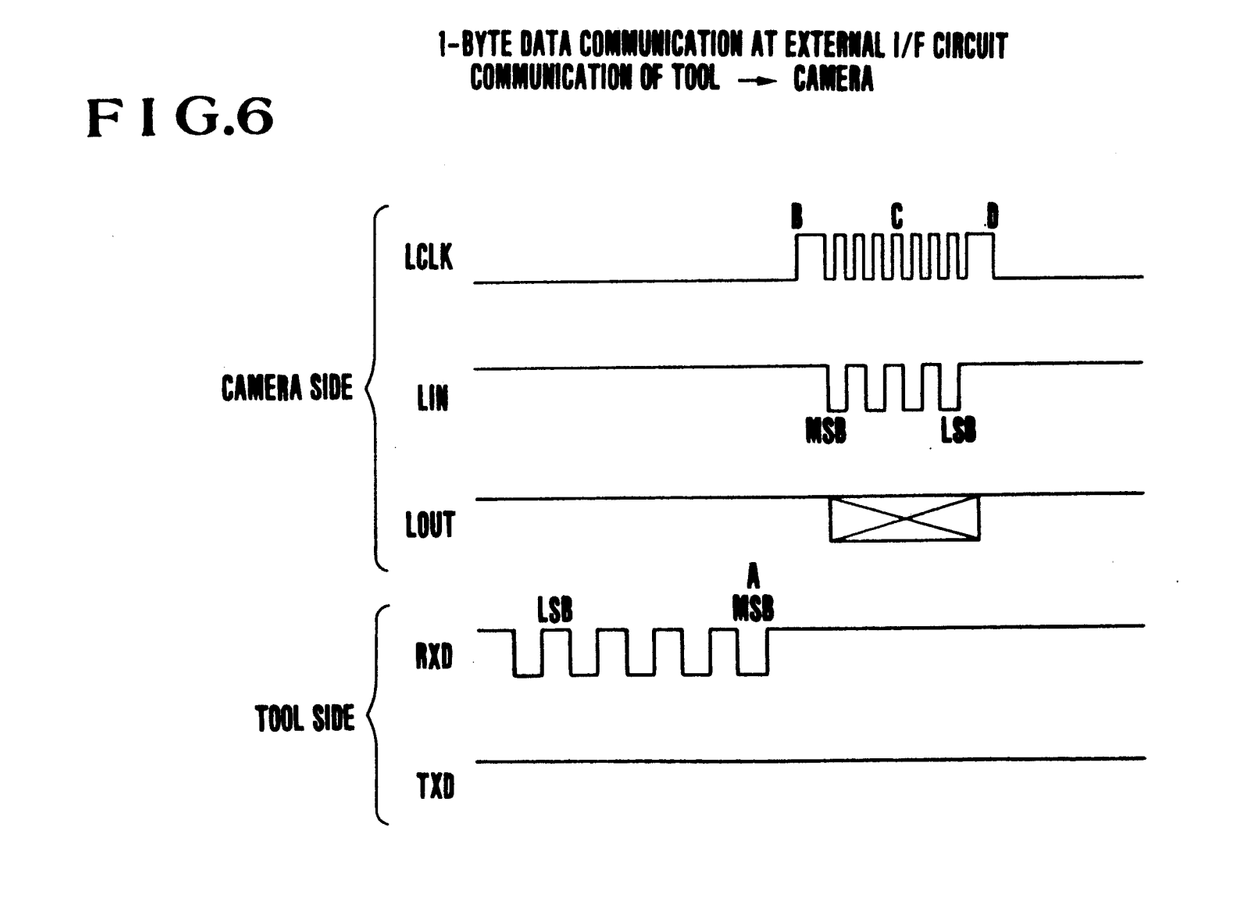
FIG. 6 is a timing chart illustrating the serial communication of signals from the tool 17 to the camera in the arrangement of FIGS. 1 and 2.

When the SPU 20 receives the communicated data, the SPU 20 performs 1-byte data communication as shown in FIG. 5 to transmit the data to the tool 17 side through a terminal TXD. When the tool 17 (or the personal computer 18) receives the data, it transmits to the camera 1-byte data which identifies the tool 17 itself. The processing executed in the SPU 20 at this time is as shown in FIG. 6; that is to say, when the SPU 20 receives the 1-byte data (A in FIG. 6), the SPU 20 sets the data received from the tool 17 in a communication register provided by the SPU 20, and cancels a busy state of lens communication (B in FIG. 6). Normally, the camera has the initiative in the communication for cancelling such a busy state since this cancelation is synchronized with clocks generated from the camera. However, in the case of communication from the tool 17, to give the tool 17 an apparent communication initiative, the "busy" function of the terminal LCLK is utilized to cancel the busy state and set the LCLK terminal to its high level only when communication with the tool 17 is needed.

Then, the camera initiates the communication with the lens device 13, and the data set in the communication register in the SPU 20 is outputted from the SOUT terminal through the lens terminal LIN to the camera in synchronism with the LCLK clock supplied from the camera (C in FIG. 6). When the SPU 20 detects the completion of the communication, the SPU 20 sets an output port OP1 to a high level, thereby placing the LCLK terminal in the busy state (D in FIG. 6).

Figure 7:
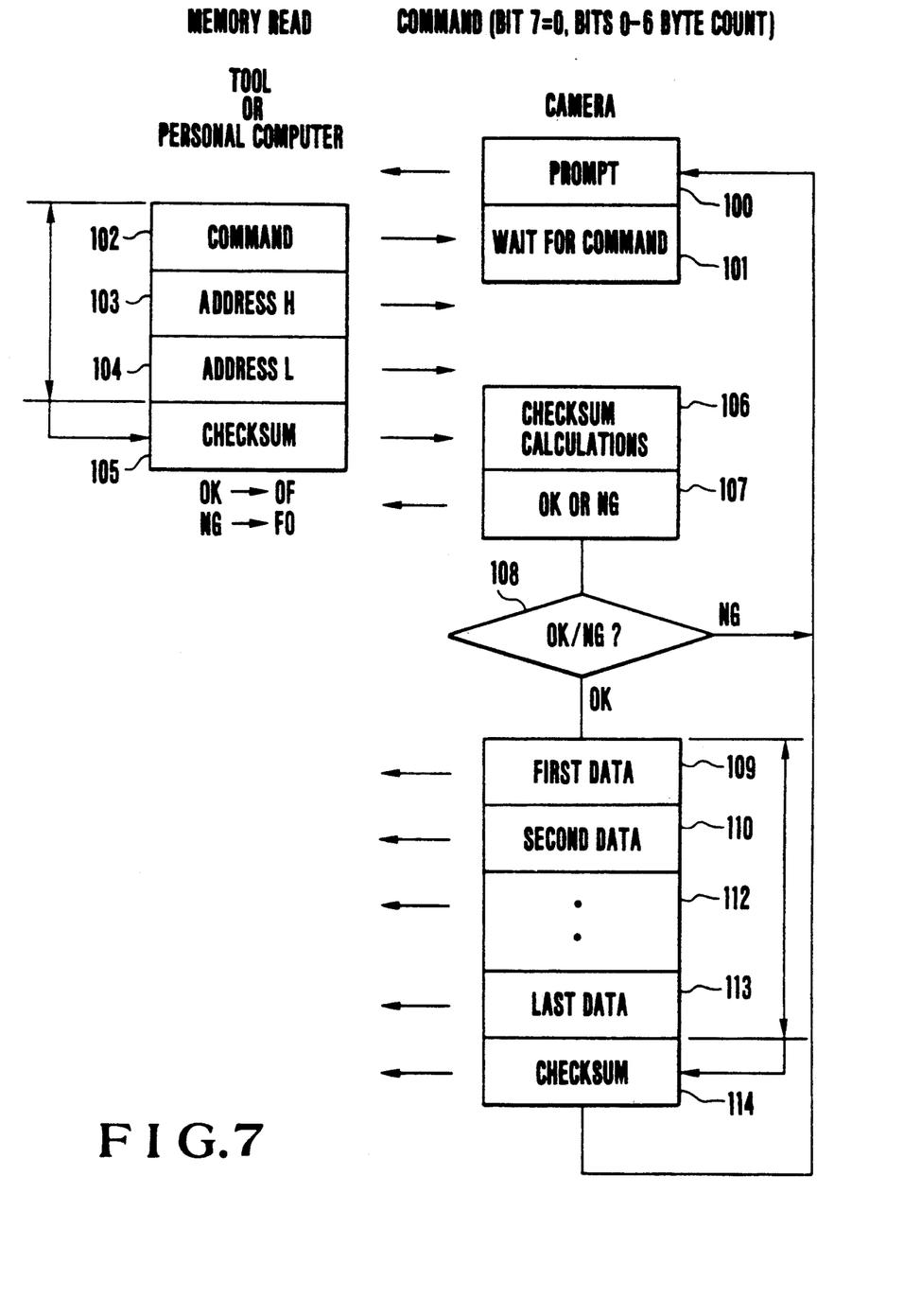
FIG. 7 is a schematic illustration showing one example of the contents of communication which is carried out for reading memory contents between the tool 17 (or a personal computer) and the camera in the arrangement of FIGS. 1 and 2.

The CPU 1 determines from the above-described operation whether the lens device 13 or the tool 17 has been attached. If it is determined that the tool 17 has been attached, data indicative of that fact is transmitted from the camera to the tool 17 as shown in FIG. 7. In this case, the data is transmitted from the camera to the lens device 13 after the activation of the external I/F circuit 16. This processing is also applied to the operation of transmitting data indicating whether the lens device 13 is a communicable lens device.

As shown in FIG. 5, first, to accept the communication from the camera, the busy state provided by the LCLK terminal is cancelled (E in FIG. 6). Then, camera-to-lens communication is initiated on the camera side and the data is transmitted to the SPU 20 (F in FIG. 6). When the SPU 20 detects the completion of the communication, the SPU 20 places the LCLK terminal in the busy state (G in FIG. 6) and transmits the received data to the tool 17 through the TXD terminal. When the communication process up to this step is completed, the camera is placed in a ready state for acceptance of communication from the tool 17. This state corresponds to the prompt (#100) shown in each of FIGS. 7 to 9.

Figure 8:
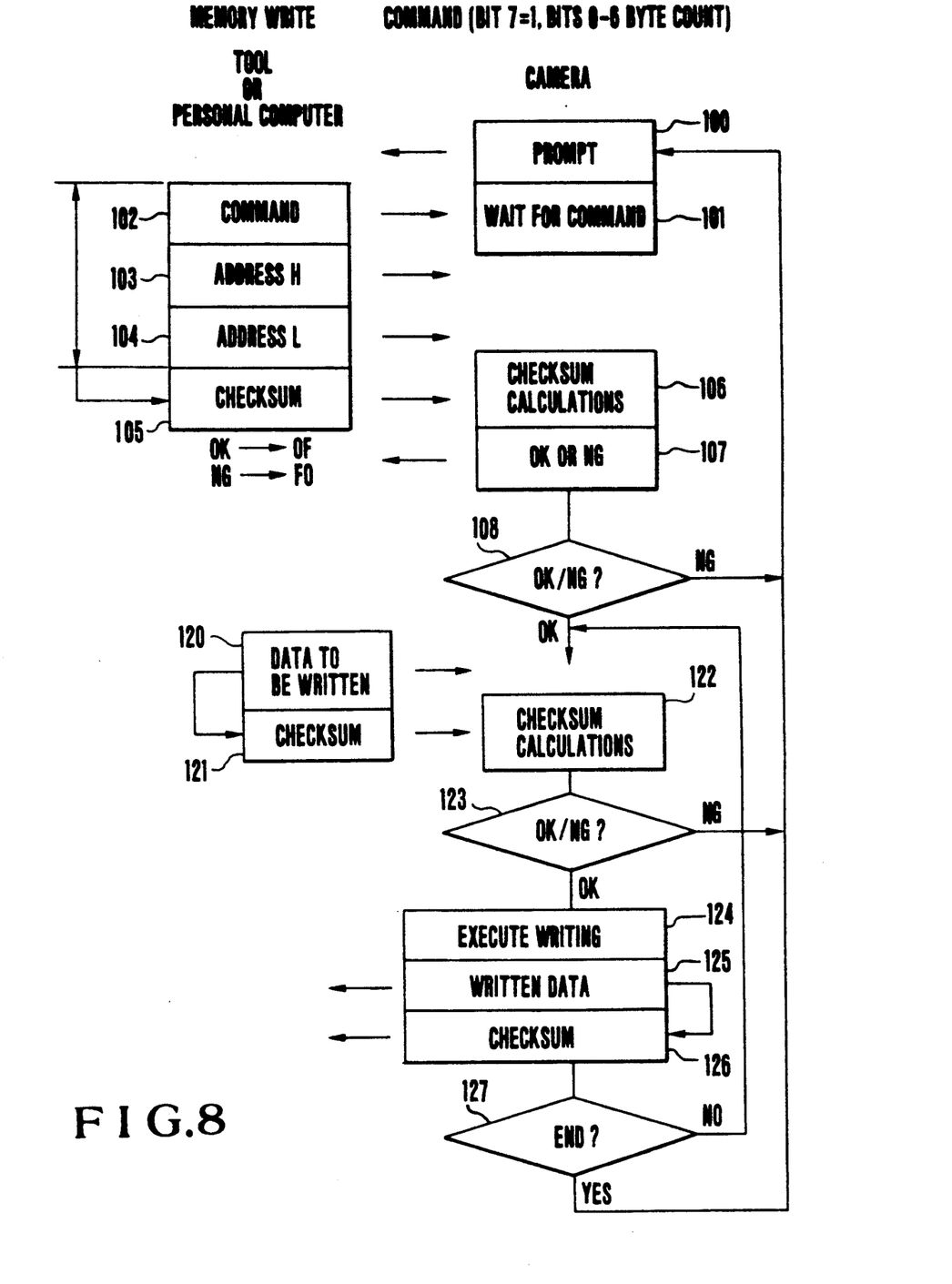
FIG. 8 is a schematic illustration showing one example of the contents of communication which is carried out for memory writing between the tool 17 (or the personal computer) and the camera in the arrangement of FIGS. 1 and 2.

Means for carrying out writing, reading or erasure of corrected data within the camera during the ready state in accordance with access from the tool 17 as well as means for executing the subroutine program in the camera during the ready state in accordance with access from the tool 17 will be described below with reference to FIGS. 7 to 9.

FIG. 7 is a sequence diagram for reading the data stored in a RAM or an electrically erasable and programmable memory incorporated in the camera CPU 1. The camera transmits to the tool 17 the prompt (#100) data indicating that the camera is in the state ready for communication, and the camera waits for arrival of a command (#101) from the tool 17 which command causes the camera to determine what operation to be executed.

The command data (#102) from the tool 17 is transmitted as 1- byte data, and if the data is bit 7=0, the memory read sequence shown in FIG. 7 is designated so that data in the memory can be read by the number of bytes designated by 7 bits 0 to 6. When the command data (#102) is transmitted to the camera, data for designating memory addresses having the next data to be read is transmitted to the camera on a byte-by-byte basis in Steps #103 and #104. Subsequently, checksum calculations (#105) for determining whether the command data and the address data are correct, are carried out on the tool 17 side. Simultaneously, the camera also performs checksum calculations (#106) for determining whether the received data are correct.

It is determined (#107) whether the result of the checksum calculations (#105) performed in the tool 17 is the same as that of the checksum calculations (#106)

performed in the camera. If the answer is "OK", data indicative of "OK" is transmitted to the tool 17 (in this embodiment, data of "0FHEX" is transmitted for "OK" and data of "F0HEX", for "NG"). If the result of the decision is "NG" in Step #107, it is determined (#108) whether the process is made to proceed to the next sequence, and the process returns to the prompt (#100). In the case of "OK", the process proceeds to the next sequence.

In the case of "OK", the camera transmits to the tool 17 the memory data specified by the memory addresses designated in Steps #103 and #104, by the number of bytes designated by the command (#109–#113). The camera determines by checksum whether the transmitted data conforms to that requested by the tool 17 (#114). If the result of the checksum performed in the camera is "NG" and the data "F0HEX" is transmitted to the tool 17 (#107) (#114), the tool 17 ignores the transmitted and received data and outputs, for example, an error message.

When the checksum (#114) is completed, the sequence returns to the prompt (#100) and waits for a command to be sent from the tool 17. Then, the data in the memory are read as shown in FIG. 7, and if the data are to be modified, processing is executed as shown in the memory write sequence diagram of FIG. 8. The prompt (#100) to the checksum decision (#108) are performed in a manner similar to that explained in connection with the memory read sequence shown in FIG. 7. In this case, since the command data represents a write command, bit 7 is set to 1 as data instructing the camera to execute the memory write sequence. When the camera receives the command data (bit 7=1), it determines that the memory write sequence has been designated.

If the result of the checksum decision (#108) is "OK", this indicates that the tool 17 has received the OK data "0FHEX" in Step #107. Accordingly, the tool 17 transmits data to be written to the camera (#120), and also performs checksum on the data (#121) and transmits the result data to the camera. The camera also performs checksum calculations on the received data in Step #122, and if it is determined that the result is "NG", the process is made to return to the prompt (#100). If the answer is "OK", the data to be written which has been transmitted in Step #120 is written into the memory addresses designated in Steps #103 and #104 (#124). The thus-written data is transmitted to the tool 17 (#125) so that the data can be monitored on the tool 17 side at the same time. Checksum is applied to the data (#126), and the result data is also transmitted to the tool 17. If writing is to be continued, the process returns to Step #120 and the next data is inputted from the tool 17 to the camera. If it is determined that the writing has been completed, the process returns to the prompt (#100) and is placed in the ready state.

Figure 9:
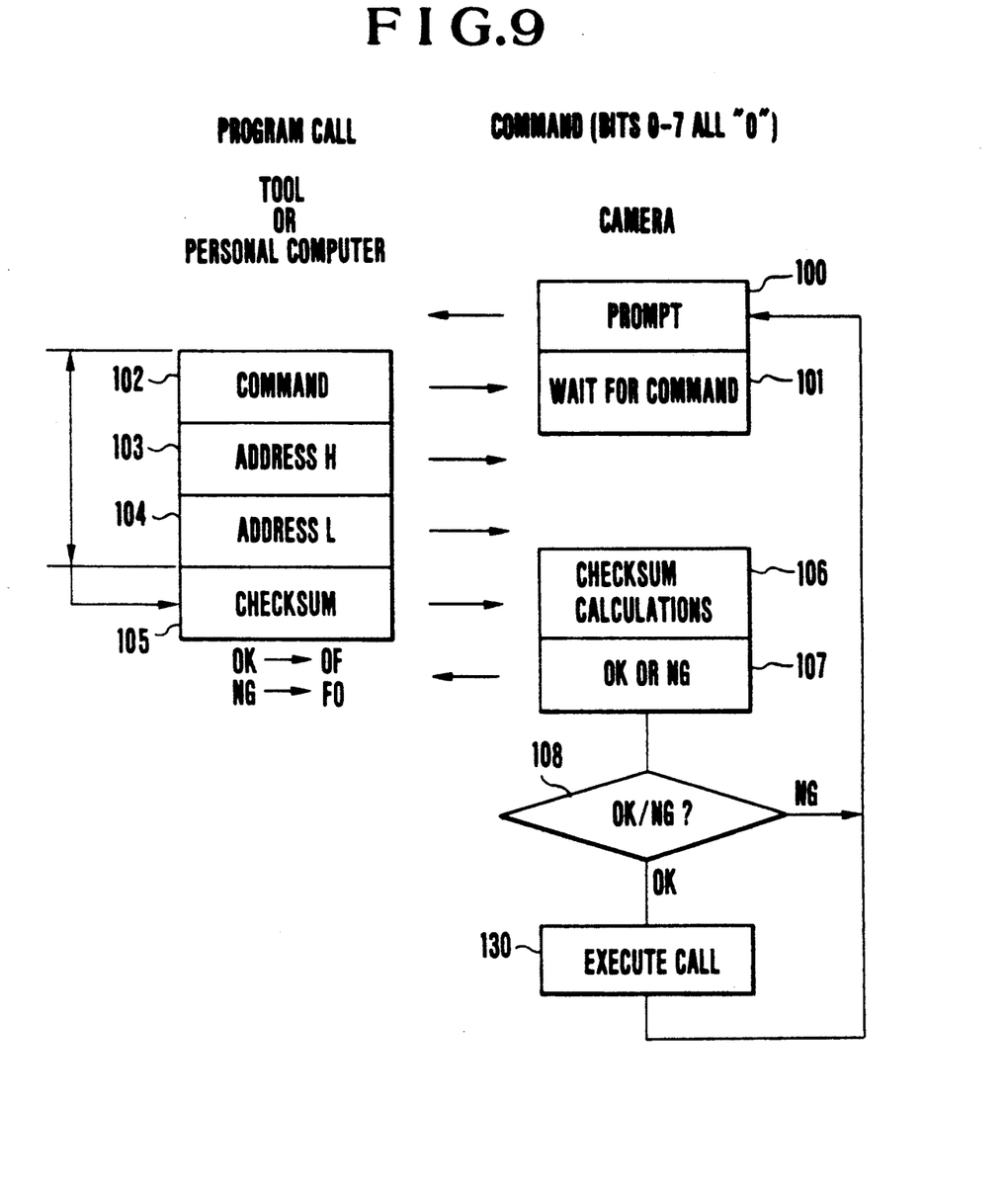
FIG. 9 is a schematic illustration showing one example of the contents of communication which is carried out for program execution between the tool 17 (or the personal computer) and the camera in the arrangement of FIGS. 1 and 2.

FIG. 9 shows a sequence for executing a subroutine program in each adjustment step. In FIG. 9, the prompt (#100) to the checksum decision (#108) are similar to those explained in connection with the memory read sequence of FIG. 7 and the memory write sequence of FIG. 8. In a command which is used for calling a program, bits 0-7 are all "0". The camera determines from this command that a program call has occurred. Call execution (#130) can be initiated merely by designating the leading address of the subrouting program to be called, on the basis of data for calling the program.

The foregoing description of the present embodiment refers to the case where information is communicated between the camera and a particular camera accessory, i.e., the lens device 13, through the communication terminal 10 for communication with the lens device 13. However, the aforesaid method can similarly be applied to information communication between the camera and other camera accessories, for example, information communication performed via the communication terminal 11 for the external flash unit 14 or information communication performed via the back-lid communication terminal 12 for the data back 15 for imprinting data on film.

The external I/F circuit 16 in the present embodiment may be incorporated in an extender, an extension tube or the lens device 13. In addition, by partly modifying the construction of the external I/F circuit 16, it is possible to achieve information communication between the accessory side and the tool 17, and if an arrangement is adopted which makes it possible to monitor the contents communicated between the camera and the accessory side, the external I/F circuit 16 can be utilized as an operation analysis device for cameras.

In the aforementioned arrangement in which the external I/F circuit 16 is incorporated in the lens device 13, the external I/F circuit 16 may be disposed in and connected to the accessory circuit in the lens device 13, as shown by dashed lines in FIG. 1.

What is claimed is:

1. A camera system composed of a camera body having a computer housed therein and an accessory device having at least one of a computer and a memory circuit arranged to communicate with the computer in the camera body when the accessory device is in a state attached to the camera body, comprising:
   a) an intermediate device insertable between the camera body and the accessory device, said intermediate device having a first mode for performing data communication between the computer in the camera body and said at least one of the computer and the memory circuit of the accessory device when in a state inserted between the camera body and the accessory device and a second mode, said intermediate device further having a terminal connected to at least one of an external tool and a computer, said intermediate device performing communication between the computer in the camera body and said at least one of the external tool and computer for adjustment or checking in said second mode.

2. A camera system according to claim 1, wherein reading out of data from the computer in the camera body or writing of data in the computer in the camera body is performed by the communication of the second mode.

3. A camera system according to claim 2, wherein the accessory device is a lens device.

4. A camera system composed of a camera body having a computer housed therein and an accessory device having at least one of a computer and a memory circuit arranged to communicate with the computer in the camera body when the accessory device is in a state attached to the camera body, comprising:
   a) an accessory circuit portion including said at least one of said computer and said memory circuit which communicates with the computer in the camera body; and
   b) an interface circuit portion, said interface circuit portion having a first mode for performing data communication between the computer in the camera body and the accessory circuit portion and a second mode, said interface circuit portion having having a terminal portion connected to at least one of an external tool and an external computer, said interface circuit portion performing communication between the computer in the camera body and said at least one of the external tool and the external computer for adjustment or checking in said second mode.

5. A camera system according to claim 4, wherein reading out of data from the computer in the camera body or writing of data in the computer in the camera body is performed by the communication of the second mode.

6. A camera system according to claim 5, wherein the accessory device is a lens device.

7. An intermediate device for a camera system composed of a camera body having a computer housed therein, and an accessory device having at least one of a computer and a memory circuit arranged to communicate with the computer in the camera body when the accessory device is in a state attached to the camera body, said intermediate device being arranged to be inserted between the camera body and the accessory device, having a first mode for performing data communication between the computer in the camera body and said at least one of the computer and the memory circuit of the accessory device when said intermediate device is in a state inserted between the camera body and the accessory device and a second mode, said intermediate device having a terminal portion connected to at least one of an external tool and an external computer, said intermediate device performing communication between the computer in the camera body and said at least one of the external tool and the external computer for adjustment or checking in said second mode.

8. An intermediate device according to claim 7, wherein reading out of data from the computer in the camera body or writing of data in the computer in the camera body is performed by the communication of the second mode.

9. An accessory device attachable to a camera body having a computer housed therein, comprising:
   a) at least one of a computer and a memory circuit for performing data communication with the computer in the camera body; and
   b) an interface circuit having a first mode for performing communication between the computer in the camera body and said at least one of said computer and said memory circuit and a second mode, said interface circuit having a terminal portion connected to at least one of an external tool and a computer, said interface circuit performing communication between the computer in the camera body and said at least one of the external tool and the computer for adjustment or checking in the second mode.

10. An accessory device according to claim 9, wherein reading out of data from the computer in the camera body or writing of data in the computer in the camera body is performed by the communication of the second mode.

* * * * *